United States Patent [19]

Smakman

[11] 4,177,140
[45] Dec. 4, 1979

[54] METHOD FOR REMOVING A WEAK ACID FROM AN AQUEOUS SOLUTION

[75] Inventor: Robert Smakman, Nigtevecht, Netherlands

[73] Assignee: Akzona Inc., Asheville, N.C.

[21] Appl. No.: 872,843

[22] Filed: Jan. 27, 1978

[30] Foreign Application Priority Data

Jan. 26, 1977 [NL] Netherlands .................. 7700763

[51] Int. Cl.$^2$ ............................. C02B 1/60
[52] U.S. Cl. ............................. 210/37 R; 521/32
[58] Field of Search ............. 210/37 R; 521/31, 32, 521/38

[56] References Cited

U.S. PATENT DOCUMENTS

| | | | |
|---|---|---|---|
| 2,503,769 | 4/1950 | Roberts | 210/37 R |
| 2,664,441 | 12/1953 | Owens et al. | 210/37 R |
| 2,840,533 | 6/1958 | Hwa | 210/37 R |
| 3,001,868 | 9/1961 | Aveston et al. | 423/22 |
| 3,197,401 | 7/1965 | Arai | 210/37 R |

FOREIGN PATENT DOCUMENTS 954435 4/1964 United Kingdom.

Primary Examiner—Charles N. Hart
Assistant Examiner—Ivars Cintins
Attorney, Agent, or Firm—Francis W. Young; Robert F. Green

[57] ABSTRACT

A method for removing a weak acid from an aqueous solution containing said acid is disclosed. The method comprises contacting said aqueous solution with an anion exchanger containing both strongly basic and weakly basic groups, said exchanger having a matrix comprising a copolymer of styrene and not more than about 20%, by weight, of a cross-linking agent, from about 3% to about 90% of the total basic groups being strongly basic groups of the quaternary ammonium type having the structure $-CH_2N^+R_1R_2R_3$, wherein $R_1$, $R_2$, and $R_3$ are independently selected from the group consisting of $-CH_3$, $-C_2H_5$, and $-C_2H_4OH$, and the balance of the basic groups being weakly basic groups of the tertiary amine type.

6 Claims, No Drawings

METHOD FOR REMOVING A WEAK ACID FROM AN AQUEOUS SOLUTION

BACKGROUND OF THE DISCLOSURE

This invention relates to a method for removing a weak acid from an aqueous solution containing said acid. More particularly, this invention relates to the removal of such a weak acid with the use of an anion exchanger.

Netherlands patent application No. 241,033 teaches that a chloromethylated cross-linked polystyrene aminated with dimethylamine may be used to remove silica. The cross-linking reaction in the amination of the chloromethylated cross-linked polystyrene gives rise to the formation of quaternary ammonium groups with each quaternary group being attached to two benzene rings, in accordance with the following formula:

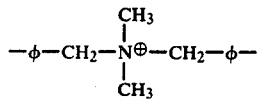

In the referenced Dutch patent application it is indicated that in the demineralization of aqueous solutions containing organic purities, the foregoing resin will be strongly fouled in repeated charging and regenerating cycles. Furthermore, it is believed that the fouling will lead to a large reduction in the strong base capacity of the resin, a less complete exchange or uptake of acids or anions, particularly of weakly dissociated acids such as silica, and the need for a larger volume of rinse water after regeneration. As a result of the foregoing, the resins may, after some time, become entirely useless. In the referenced Dutch patent application it is stated that the central problem is caused by the fact that on the one hand strongly basic groups can remove silica, but on the other hand, the fouling is directly related to the presence of such groups. Severe fouling problems are already said to arise in the case where the resin contains as little as 20% of strongly basic groups having the above-indicated structure.

In the Dutch patent application No. 241,033, the fouling problem is believed to be overcome by the use of macroporous, strongly basic resins containing at least 25%, by weight, and preferably more than 30%, by weight, of a cross-linking agent. A serious drawback to the resulting exchanger is that in spite of the macroporosity of the resin obtained, the product will become increasingly susceptible to fouling. In practice, such resin will therefore still be insufficiently resistent to fouling to be commercially acceptable. Moreover, the amount of caustic soda used in the regeneration is particularly high as a result of the high degree of cross-linking and the resulting high selectivity to halide ions, relative to hydroxyl ions.

SUMMARY OF THE INVENTION

Surprisingly, it has now been found that in the removal of weak acids, such as silica and organic compounds having a weakly acid character, from aqueous solutions, very little, if any, resin fouling will occur if one utilizes an anion exchanger which contains certain strongly basic and weakly basic groups and has a matrix which is only moderately cross-linked.

In particular, the present invention provides a method for removing a weak acid from an aqueous solution containing said acid, comprising contacting said solution with an anion exchanger containing both strongly basic and weakly basic groups, said exchanger having a matrix comprising a copolymer of styrene and not more than about 20%, by weight, of a cross-linking agent, from about 3% to about 90% of the total basic groups being strongly basic groups of the quaternary ammonium type having the structure $-CH_2N^{\oplus}R_1R_2R_3$, wherein $R_1$, $R_2$ and $R_3$ are independently selected from the group consisting of $-CH_3$, $-C_2H_5$, and $-C_2H_4OH$, and the balance of the basic groups being weakly basic groups of the tertiary amine type.

DESCRIPTION OF THE PREFERRED EMBODIMENTS

As indicated, the present invention provides a method for removing a weak acid from an aqueous solution containing said acid. The term "weak acid" as utilized herein means an acid having a $pK_a$ of at least 3. Representative examples of such acid includes inorganic acids, such as silica, carbonic acid, and organic acids such as humic acids.

As indicated, the exchanger which is utilized in the practice of a method of the present invention contains both strongly basic and weakly basic groups. It is preferred that from about 4% to about 80% of the basic groups be strongly basic groups of the quaternary ammonium type, as discussed above. The additional presence of a limited amount, for instance, up to about 25%, of quaternary ammonium groups of the cross-linked type, which themselves loose their strongly basic character as a result of fouling, has not been found to be objectionable and is useful in the practice of the present method. The remaining basic groups should be weakly basic groups of the tertiary amine type.

It should be noted that the bifunctional anion exchangers utilized in the practice of the present invention are known to be useful for the recovery of gold and silver from a cyanide-containing aqueous solution and one may refer in this respect to British Pat. No. 954,435. Such a field of application, however, is essentially different from the field of application of the present invention.

The method of the present invention offers several important advantages, for example, in the water demineralization for the preparation of boiler feed water, process water, or the like. The removal of silica is usually, but not necessarily, accompanied by the removal of acids, anions, and/or organic substances. As is known, weakly basic exchangers have a high regeneration yield, good resistance to fouling, and organic compounds are reversibly combined with the exchanger. However, such exchanger poorly combines with weak acids such as silica and is useful only in an acidic medium. For the removal of silica one has been forces to make use of a strongly basic anion exchanger. Other drawbacks of the weakly basic anion exchanger include the large difference in volume between the charged and the regenerated form, and the fact that the exchanger is of relatively low density.

Strongly basic resins do combine with anions of weak acids, both from the OH$^-$ form and the salt form, for instance, the Cl$^-$ form, and are therefore also effective in a neutral or a basic medium. Such basic resins display a more favorable swell:shrinkage ratio, and have a relatively high density. Their susceptability to fouling and their low regeneration yield, however, form serious drawbacks. Moreover, strongly basic resins, especially in the OH⁻ form, have limited thermal stability. Fouling may be couteracted somewhat by periodic treatment of the anion exchanger with brine, but such a technique is far from sufficient. In practice, one often uses a column of a weakly basic resin placed before a column of a strongly basic resin. In such an instance, however, there is the drawback of utilizing an additional column with its associated lines and control and regulating equipment. An alternative procedure consists in that in one column there may be contained a lower layer of a strongly basic anion exchanger, and an upper layer of a weakly basic anion exchanger. The solution to be treated may then be passed through the column downwardly and regenerated upwardly and in this respect, one is referred to British Pat. No. 1,185,609. The foregoing procedure, however, calls for the use of an intricate apparatus and process control, for instance, in maintaining an unmixed two-layer system during column charging and regeneration, particular consideration being required to prevent the formation of channels during regeneration. The required rinsing out of fine resin particles from the foregoing type of anion exchanger bed is also very difficult. Furthermore, because of the limited range of the ratio between the amounts of strongly basic and weakly basic anion exchangers, such a method cannot readily be adapted to wide variations of weak to strong acids in the solution to be treated.

When the method according to the present invention was applied, it was found that the resin combined the abovementioned advantages of both the strongly basic and the weakly basic resins and that the disadvantages of the two separate resins were minimized or eliminated. The resins according to the present invention combined with the weak and the strong acids, and with their anions and organic impurities, and furthermore, the regeneration yield relative to strongly basic resins is considerably increased.

It is also surprising that the resin is far less susceptible to fouling than the known strongly basic resins or weakly basic resins with strongly basic groups which were only formed as a result of cross-linking in the amination. It has been theorized that the strongly reduced tendency to fouling may be attributed to the fact that the weakly basic part of the resin according to the present invention which is in the vicinity of the non-cross-linked and readily accessible strongly basic groups may be satisfactorily discharged in the regeneration of the anion exchanger.

Furthermore the change in volume of the resin utilized in the present invention during charging and regeneration is generally still less than that of strongly basic resins, and in some instances, the volume change is eliminated. As a result, column behavior, retention of bed packing, and mechanical strength, are extraordinarily good. Another advantage consists in the density of the resin being higher than that of the conventionally weakly basic resin. It has been found that the strongly basic capacity of the resin which may be applied according to the process of the present invention can be better maintained at relatively higher temperatures than the strongly basic resins usually employed for the above-referenced purpose. Such an advantage is especially promising as far as condensate treatment and catalytic application are concerned.

The present bifunctional anion exchangers may be employed according to the present invention for the removal of organic compounds having a weakly acid character and/or their anions, for instance, the removal of humic acids from surface water, and the removal of colored or color-forming substances from solutions occurring in the foodstuff industry, such as sugar solutions. The bifunctional resins retain their purifying power and their strongly basic capacity far better than other strongly basic resins.

Anion exchangers having the abovementioned bifunctional structure may be prepared in various known manners. As a rule, one will typically choose as a matrix a chloromethylated (co)polymer of styrene cross-linked before and/or during chloromethylation. When use is made of a matrix already cross-linked before chloromethylation, the exchanger may be prepared by having the polymerization of styrene take place in the presence of a cross-linking monomer, generally in an amount not greater than about 20%, by weight, and preferably in an amount not greater than about 15%, by weight, based on the total amount, by weight, of the monomers. As a cross-linking monomer there may be utilized a compound having at least two ethylenically unsaturated groups, for instance: 1,3-butadiene, isoprene, ethylene glycol dimethacrylate or vinyl methacrylate, but preferably di- or polyvinyl aromatic compounds such as divinyl ethyl benzene, trivinyl benzene, and more particularly, technical divinyl benzene.

Polymerization, as a rule, may be carried out utilizing typical suspension polymerization techniques, at a temperature generally in the range of about 10° C. to about 160° C., in the presence of a radical initiator, for instance: benzoyl peroxide, lauroyl peroxide and/or cumene hydroperoxide or an azo compound, for instance, azobisisobutyronitrile. Polymerization may be carried out, if desired, in the presence of one or more compounds which cause the polymer being prepared to precipitate and/or to solvate, for instance: hexane, heptane, cyclohexane, amyl alcohol, cyclohexanol, toluene, xylene and/or chlorobenzene. Or a linear polymer, such as polystyrene, may have been dissolved in the monomer compound(s) and must then be removed from the polymer after polymerization. The presence of such compounds during polymerization leads to formation of macroporous polymers. Polymers of the gel type or microporous polymers are also useful.

After chloromethylation of the matrix in a known manner, the resulting product may be so aminated that the required weakly basic and strongly basic groups are introduced. Amination may be carried out with, for instance, a mixture of dialkyl amine and trialkyl amine. The alkyl groups generally are methyl, ethyl and/or $C_2H_4OH$ groups. As the secondary amine, preferably dimethylamine is employed, partly because of its low equivalent weight which makes it the most attractive for economical reasons. On more or less the same basis, it is preferred that as the tertiary amine, trimethyl amine should be utilized, although, also triethyl amine may be so employed. To increase the regeneration yield the tertiary amine may be a tertiary ethanolamine.

The amounts of secondary and tertiary amines to be contained in the amine solution are dependent on the desired ratio of weakly basic to strongly basic groups in the final resin. The ratio is governed inter alia by the application requirements, particularly by the ratio of strong to weak acids or anions, and the desired leakage level and regeneration yield. As a rule, the ratio of the number of strongly basic to the number of weakly basic groups in the anion exchanger, according to the present invention, is in the range of about 3:97 to about 90:10, and preferably in the range of about 4:96 to about 80:20.

Another simple method for the preparation of useful bifunctional anion exchangers is described in U.S. Pat. No. 3,001,868. The method discussed therein involves the addition of dialkylamine to the matrix, followed by quaternization of part of the tertiary amine groups with an alkylhalide. For such a purpose, also dialkyl sulphate may be utilized. The amount of alkylating agent is dependent on the fraction of strongly basic groups to be introduced.

The invention will be described in more detail in the following non-limiting examples. In Comparative Example C and Examples 1–8, the swelling or shrinking of the resins is attended with the strongly basic groups changing from the OH$^-$ form to the Cl$^-$ form and simultaneously with the weakly basic groups changing from the free-base form to the HCl form. Such changes are indicated by the change from the free-base/OH$^-$ form to the HCl/Cl$^-$ form.

COMPARATIVE EXAMPLE A

In a known manner of suspension polymerization a porous copolymer of styrene and divinyl benzene was obtained. The divinyl benzene content was 3%, by weight. The apparent density of the polymer beads was 0.7. The product obtained was subsequently chloromethylated and aminated with trimethylamine. For this purpose 100 grams of copolymer were swollen in a mixture of 200 ml of monochloromethyl ether and 500 ml of trichloroethane. Next, over a period of 2.5 hours 55 grams of aluminium chloride were added at a temperature of 35° C., after which the reaction mixture was heated to 45° C. for two more hours. The reaction mixture was then poured into water and washed until neutral. The product still swollen in trichloroethane was subsequently aminated with 600 ml of an aqueous 15%-solution of trimethylamine for 4 hours at a temperature of 45° C. After steaming and washing a macroporous, strongly basic resin (A) was obtained. The capacity of strongly basic groups was 1010 meq/l. The shrinkage from the OH$^-$ form to the Cl$^-$ form was 12%.

COMPARATIVE EXAMPLE B

In a known manner of suspension polymerization a glassy copolymer of styrene and ethylene glycol dimethacrylate was obtained. The copolymer contained 1.5%, by weight, of crosslinking comonomer. Chloromethylation was carried out by swelling 100 grams of the copolymer in a mixture of 700 ml of dichloroethane and 250 ml of monochloromethyl ether and subsequently, over a period of 3 hours, adding with stirring 25 grams of zinc chloride at a temperature of 30° C. Next, the reaction mixture was kept at a temperature of 30° C. for a further 2 hours. Then the reaction mixture was slowly poured into 150 ml of acetone, followed by adding water and washing until neutral. The product still swollen in dichoroethane was aminated with 600 ml of an aqueous 15%-solution of trimethylamine for 6 hours at a temperature of 45° C. The product was subsequently steamed and washed. The resulting glassy strongly basic resin contained strongly basic groups in an amount of 1120 meq/l. The shrinkage from the OH$^-$ for to the Cl$^-$ form was 14%.

COMPARATIVE EXAMPLE C

In a known manner of suspension polymerization a porous copolymer of styrene and 8%, by weight, of divinyl benzene was obtained; the apparent density of the polymer beads was 0.68. For chloromethylation 100 grams of the copolymer were swollen in a mixture of 225 ml of chloromethyl ether and 450 ml of methylene chloride. Over a period of 3 hours 70 grams of aluminium chloride were added with stirring at 35° C., at which temperature the mixture was kept for 2 more hours. The beads were washed with methylene chloride and tetrahydrofuran. For amination this product was added to 500 ml of an aqueous solution containing 45%, by weight, of dimethylamine. The mixture was heated for 10 hours at 70° C. After steaming and washing a macroporous resin (C) was obtained which contained weakly basic groups in an amount of 1210 meq/l and cross-linked strongly basic groups in an amount of 130 meq/l. The swelling from the free-base/OH$^-$ form to the HCl/Cl$^-$ form was 25%.

COMPARATIVE EXAMPLE D

The procedure of Comparative Example C was repeated in such a way that the amination was carried out using 500 ml of an aqueous 30%-solution of dimethylamine. The resulting product was a macroporous resin (D) which contained weakly basic groups in an amount of 1140 meq/l and cross-linked strongly basic groups in an amount of 230 meq/l. The swelling from the free-base/OH$^-$ form to the HCl/Cl$^-$ form was 21%.

EXAMPLE 1

500 ml of the resin C (according to Comparative Example C) regenerated with dilute caustic soda were suspended in 500 ml of water. After adding 20 grams of NaCl and 15 grams of Na$_2$CO$_3$, 12.5 grams of gaseous CH$_3$Cl were fed into the solution, with stirring, over a period of 2 hours at a temperature of 22° C. The resulting macroporous resin (I) had a weakly basic capacity of 840 meq/l and a strongly basic capacity of 350 meq/l. The swelling from the free-base/OH$^-$ form was only 4%.

EXAMPLE 2

500 ml of the resin C (according to Comparative Example C), whose weakly basic groups were in the free-base form and whose strongly basic groups were in the Cl$^-$ form, were suspended in 500 ml of water. After cooling down to 10° C., 25 grams of gaseous CH$_3$Cl were introduced, with stirring, over a period of three hours. The endproduct (II) contained weakly basic groups in an amount of 520 meq/l and strongly basic groups in an amount of 490 meq/l. The shrinkage from the free-base/OH$^-$ form to the HCl/Cl$^-$ form was 1%.

EXAMPLE 3

500 ml of the resin C (according to Comparative Example C), regenerated with dilute caustic soda were suspended in 500 ml of water in which 20 grams of Na$_2$CO$_3$ had been dissolved. Over a period of 1 hour 15 grams of dimethyl sulphate were added to it, with stirring, at a temperature of 25° C. Subsequently, the mixture was stirred for a further 4 hours at 50° C. The resulting macroporous resin III contained weakly basic groups in an amount of 1050 meq/l and strongly basic groups in an amount of 290 meq/l. The swelling from the free-base/OH⁻ form to the HCl/Cl⁻ form was 11%.

EXAMPLE 4

In a known way of suspension polymerization a macroporous copolymer of styrene, 2% by weight of ethylene glycol dimethacrylate and 2% by weight of divinyl benzene was obtained. 100 grams of this polymerization product were swollen in a mixture of 200 ml of monochloromethyl ether and 400 ml of dichloroethane. Over a period of 2.5 hours 65 grams of aluminium chloride were added, with stirring, at 35° C., after which the mixture was heated to 45° C. for a further 2 hours. Subsequently, the reaction mixture was poured into acetone and the beads were washed out with acetone and water. The resulting chloromethylated product was added to 600 ml of an aqueous mixture containing 29% by weight of dimethylamine and 14% by weight of trimethylamine. The mixture was heated for 4 hours at 60° C. After the excess amine had been washed out, a macroporous resin (IV) was obtained which contained weakly basic groups in an amount of 820 meq/l and strongly basic groups in an amount of 325 meq/l. The swelling from the free-base/OH⁻ form to the HCl/Cl⁻ form was 5%.

EXAMPLE 5

Over a period of 2 hours the chloromethylated product obtained according to Example 4 was added, with cooling to 10° C., to 600 ml of an aqueous mixture containing 59% by weight of dimethylamine and 11% by weight of trimethylamine. Subsequently, the resulting mixture was heated to 50° C. for 4 hours. The excess amine was washed out and the resulting macroporous resin (V) contained weakly basic groups in an amount of 1110 meq/l and strongly basic groups in an amount of 145 meq/l. The swelling from the free-base/OH⁻ form to the HCl/Cl⁻ form was 26%.

EXAMPLE 6

The chloromethylated product obtained according to Example 4 was added to 700 ml of an aqueous mixture containing 26% by weight of dimethylamine and 14% by weight of dimethylaminoethanol. The mixture was heated for 6 hours at 45° C. The resulting macroporous resin (VI) contained weakly basic groups in an amount of 835 meq/l and strongly basic groups in an amount of 305 meq/l. The swelling of the free-base/OH⁻ form to the HCl/Cl⁻ form was 6%.

EXAMPLE 7

In a known manner of suspension polymerization a glassy copolymer of styrene and 1.5% by weight of divinyl benzene was obtained. For chloromethylation 100 grams of this product were swollen in a mixture of 700 ml of trichloroethylene and 250 ml of monochloromethyl ether. Over a period of 3 hours 25 grams of zinc chloride were added, with stirring, at a temperature of 30° C. After the mixture had been kept at 30° C. for a further 2 hours, it was poured into a mixture of acetone and water, followed by washing with water. Over a period of 6 hours the copolymer was aminated with 600 ml of an aqueous solution containing 30% by weight of dimethylamine and 12% by weight of trimethylamine. The resulting product was washed out and, after it had been acidified, liberated from trichloromethylene rests. The glassy resin (VII) obtained contained weakly basic groups in an amount of 815 meq/l and strongly basic groups in an amount of 275 meq/l. The swelling from the free-base/OH⁻ form to the HCl/Cl⁻ form was 7%.

EXAMPLE 8

The resins described in the preceding examples were tested for their utility of removing silica from Amsterdam tap water. As far as anions were concerned, the test solution was composed as follows:

| | |
|---|---|
| chloride ions | 2.2 meg/l |
| sulphate ions | 1.5 meg/l |
| bicarbonate ions | 3.2 meg/l |
| silica (expressed as $SiO_2$) | 10.4 p.p.m. |

The solution also contained such an amount of organic substance as corresponded to a $KMnO_4$ consumption of 16 p.p.m. The experiments were carried out at 20° C. with the aid of a column of strongly acid resin in the H⁺ form, a carbon dioxide expeller and a column of the basic resin, connected in series. The average carbonic acid leakage after the carbon dioxide expeller was 10 parts per million (p.p.m.), which also is taken up by the anion exchanger. The use of such a carbon dioxide expeller is, of course, not absolutely required and the total amount of carbonic acid present may be taken up by the anion exchanger, which would mean a shorter running time of the resin. The average sodium leakage after the cation exchanger was 2 p.p.m. The rate of flow through the anion exchanger was 15 bed volumes/hour. The basic resin was regenerated with a 4% NaOH solution at 40° C. The regeneration level in meq NaOH liter of resin is given in Table 1. Moreover, the resins were aged in all 500 cycles under the same conditions. These charging cycles were terminated when the effluent had a silicate content of 1 p.p.m. After every 100 cycles the resins were treated with brine, and more specifically with 3 bed volumes of 10% brine at 60° C. over a contacting period of 3 hours. Table 1 shows the respective silica leakages and the practical capacity in meq of the absorbed acids or anions per liter of resin, both determined to a silica breakthrough of 1 p.p.m. The quantities were determined on the fresh resin after 3 cycles and after an aging of 200 to 500 cycles. Also the remaining strongly basic capacity was determined.

Table 1

| Resin | Regeneration level | After 3 cycles | | | After 200 cycles | | | After 500 cycles | | |
|---|---|---|---|---|---|---|---|---|---|---|
| | | Average $SiO_2$ leakage (p.p.m.) to $SiO_2$ breakthrough | Practical capacity to $SiO_2$ breakthrough | Strongly basic capacity | Average $SiO_2$ leakage (p.p.m.) to $SiO_2$ breakthrough | Practical capacity to $SiO_2$ breakthrough | Strongly basic capacity | Average $SiO_2$ leakage (p.p.m.) to $SiO_2$ breakthrough | Practical capacity to $SiO_2$ breakthrough | Strongly basic capacity |
| A | 2000 | 0.01 | 480 | 1010 | 0.03 | 415 | 765 | 0.03 | 265 | 425 |
| B | 2000 | 0.01 | 580 | 1120 | 0.02 | 425 | 780 | 0.05 | 240 | 400 |

Table 1-continued

|  |  | After 3 cycles | | | After 200 cycles | | | After 500 cycles | | |
| --- | --- | --- | --- | --- | --- | --- | --- | --- | --- | --- |
| Resin | Regeneration level | Average SiO2 leakage (p.p.m.) to SiO2 breakthrough | Practical capacity to SiO2 breakthrough | Strongly basic capacity | Average SiO2 leakage (p.p.m.) to SiO2 breakthrough | Practical capacity to SiO2 breakthrough | Strongly basic capacity | Average SiO2 leakage (p.p.m.) to SiO2 breakthrough | Practical capacity to SiO2 breakthrough | Strongly basic capacity |
| C | 1400 | 0.8 | 105 | 130 | (1) | (1) | 15 | — | — | — |
| D | 1400 | 0.02 | 340 | 230 | (1) | (1) | 30 | — | — | — |
| I | 900 | 0.04 | 725 | 350 | 0.05 | 690 | 250 | 0.05 | 680 | 250 |
| II | 1000 | 0.02 | 665 | 490 | 0.03 | 610 | 395 | 0.02 | 595 | 375 |
| III | 1000 | 0.08 | 720 | 290 | 0.1 | 650 | 185 | 0.15 | 630 | 170 |
| IV | 900 | 0.04 | 730 | 325 | 0.05 | 700 | 270 | 0.04 | 700 | 260 |
| V | 900 | 0.15 | 745 | 145 | 0.2 | 720 | 105 | 0.2 | 715 | 95 |
| VI | 1000 | 0.2 | 760 | 305 | 0.2 | 720 | 185 | 0.3 | 705 | 175 |
| VII | 1000 | 0.04 | 720 | 275 | 0.08 | 700 | 175 | 0.07 | 690 | 165 |

(1) after 40 cycles the silica leakage at the start of a cycle is already higher than 5 p.p.m.

From the date mentioned in the table it appears that with the resins I–VII demineralization results in a satisfactory removal of silica and only little fouling takes place. The regeneration yield, i.e., the ratio in the practical capacity to the regeneration level, is considerably higher than that of the strongly basic resins A and B. The comparative resin D has limited silica removing capacity, which is even reduced to nil after about 40 cycles as a result of fouling. The comparative resins A and B are also fouled quickly.

EXAMPLE 9

In this example a non-refined sugar solution was decolorized and freed from organic compounds having a weakly acidic character by means of an anion exchanger. The sugar solution which had a dry solids content of 61° Brix and an average pH of 7.5, was percolated at 75° C. and at a rate of 4 bed volumes per hour. As anion exchangers there were used respectively a bifunctional anion exchanger VIII which had been prepared on the analogy of the procedure used in Example 4 and contained weakly basic groups in an amount of 205 meq/liter and strongly basic groups in an amount of 650 meq/liter, a bifunctional anion exchanger IX which had been prepared on the analogy of the procedure used in Example 2 and contained weakly basic groups in an amount of 80 meq/liter and strongly basic groups in an amount of 750 meq/liter and, for comparison, a standard porous strongly basic anion exchanger prepared on the analogy of the procedure used in Example A, containing strongly basic groups in an amount of 850 meq/liter. After each cycle the resins were regenerated with 2 bed volumes of an aqueous solution containing 10% by weight of sodium chloride and 0.5% by weight of sodium hydroxide. After 100 cycles the weakly basic and the strongly basic capacities of the resins were measured and also the degree of decolorization of the solution after use of the resin for 100 and 200 cycles, respectively. The degree of decolorization, measured at a wavelength of 420 nm, is expressed in ICUMSA units. The results are given in Table 2. It is clear that as compared with the standard resin which exclusively contains strongly basic groups the level of the strongly basic capacity of the bifunctional anion exchanger used in the process according to the invention and the degree of decolorization in the sugar solution are better maintained. The strongly basic and the weakly basic capacity are expressed in meq/liter.

Table 2

|  | Resin VIII | Resin IX | Standard resin (comparison) |
| --- | --- | --- | --- |
| Fresh resin |  |  |  |
| Weakly basic cap. | 205 | 80 |  |
| Strongly basic cap. | 650 | 750 | 850 |
| After 100 cycles |  |  |  |
| Weakly basic cap. | 180 | 75 |  |
| Strongly basic cap. | 540 | 700 | 540 |
| Decolorization |  |  |  |
| After 100 cycles | 96,000 | 103,000 | 82,000 |
| After 200 cycles | 92,000 | 96,000 | 65,000 |

EXAMPLE 10

In this example a potato starch dextrose having a concentration of 45° Brix and a pH of 4.4 was demineralized and freed from phosphate. The process was carried out using a two-column system, the one being charged with a sulphonic acid cation exchanger having a capacity of 1800 meq/liter and the other column with, respectively, the bifunctional anion exchangers I and IV. The dextrose was percolated at a rate of 4 bed volumes per hour during 6 hours and at a temperature of 55° C. After each cycle the anion exchanger was regenerated with 1.5 bed volume of a 4% by weight caustic soda solution. Table 3 gives the amounts of phosphate removed in the fresh state and after 100 cycles. The amounts are expressed in percentages calculated on the total amount of phosphate originally contained in the dextrose.

Table 3

|  | % phosphate removal | |
| --- | --- | --- |
|  | Fresh resin | After 100 cycles |
| anion exchanger I | 93% | 79% |
| anion exchanger IV | 92% | 81% |

What is claimed is:

1. A method for removing a weak acid from an aqueous solution containing said acid, comprising contacting said solution with an anion exchanger containing both strongly basic and weakly basic groups, said exchanger having a cross-linked a matrix comprising a copolymer of styrene and not more than about 20%, by weight, of a cross-linking agent, from about 3% to about 90% of the total basic groups being strongly basic groups of the quaternary ammonium type having the structure $-CH_2N^+R_1R_2R_3$, wherein $R_1$, $R_2$, and $R_3$ are independently selected from the group consisting of $-CH_3$, —$C_2H_5$, and —$C_2H_4OH$, and the balance of the basic groups being weakly basic groups of the tertiary amine type.

2. The method of claim 1, wherein from about 4% to about 80% of the basic groups are quaternary ammonium groups.

3. The method of claim 1, wherein $R_1$, $R_2$, and $R_3$ are all —$CH_3$.

4. A method for removing a weak acid from an aqueous solution containing said acid, comprising contacting said solution with an anion exchanger containing both strongly basic and weakly basic groups, said exchanger having a cross-linked matrix comprising a copolymer of styrene and not more than about 20%, by weight, of a cross-linking agent, from about 3% to about 90% of the total basic groups being strongly basic groups of the quaternary ammonium type having the structure —$CH_2N^+R_1R_2R_3$, wherein $R_1$, $R_2$, and $R_3$ are independently selected from the group consisting of —$CH_3$, —$C_2H_5$, and —$C_2H_4OH$, and the ratio of the number of strongly basic groups to the number of weakly basic groups is from about 3:97 to about 90:10.

5. The method of claim 4 wherein from about 4% to about 80%, of the basic groups are quaternary ammonium groups and wherein $R_1$, $R_2$, and $R_3$ are all —$CH_3$.

6. The method of claim 4 wherein the ratio of the number of strongly basic groups to the number of weakly basic groups is from about 4:96 to about 80:20.

* * * * *